Sept. 13, 1960 L. C. RENSLOW 2,952,378
CAPSULE OR GONDOLA USED IN HIGH ALTITUDE RESEARCH
Filed June 25, 1956

INVENTOR
Leonard C. Renslow
BY Robert n. Dunning
ATTORNEY

United States Patent Office 2,952,378
Patented Sept. 13, 1960

2,952,378

CAPSULE OR GONDOLA USED IN HIGH ALTITUDE RESEARCH

Leonard C. Renslow, 1038 Bartelmy Lane, St. Paul 6, Minn.

Filed June 25, 1956, Ser. No. 593,548

3 Claims. (Cl. 220—5)

This invention relates to an improvement in capsule or gondola used in high altitude research and deals particularly with an enclosure for scientific instruments which is capable of withstanding substantial variations in pressure and which is designed to enclose and to protect scientific instruments used in research operations.

During recent years the field of high altitude research has greatly increased. In research of this type, it is usual practice to seal scientific instruments in a capsule or gondola which is attached to a balloon capable of lifting the capsule or gondola into the upper atmosphere or beyond. These capsules or gondolas are equipped with parachutes so that when the balloon bursts at extremely high altitude, the gondola will float to the ground in such a manner that the shock of landing will not destroy the instruments contained therein. In many instances, these instruments require setting or calibration as close as possible to the time the ascent of the gondola is begun. However, with gondolas of usual type, considerable time is required to seal the enclosure thus increasing the possibility that the settings of the instruments will be incorrect when the gondola is sealed for departure.

An object of the present invention lies in the provision of a capsule or gondola which is made of a plastic material which is known to the trade as "Fiberglas." This material is extremely strong and is also possessed with considerable flexibility or resilience so that it is capable of withstanding tremendous shock. At the same time, the material is relatively light in weight and it is thus extremely acceptable for the present purpose.

A feature of the present invention resides in the provision of a capsule or gondola which is made in two parts, the parts having marginal peripheral flanges which are complementary and may be attached in substantially face to face relation. A gasket is inserted between the two parts of the gondola in order to provide a tight seal between the parts. This arrangement as described to this point is conventional. However, I employ a novel and effective means of sealing the two parts together so as to greatly simplify the construction and to materially decrease the cost of production.

Capsules or gondolas, usually made of metal, have been provided with mating peripheral flanges which are normally secured together by angularly spaced cap screws or similar means. However, in view of the light weight of the metal involved, it has usually been necessary to place these cap screws at relatively short intervals about the entire circumference of the flanges. Thus as the capsule is sealed, considerable time is required in inserting and tightening all of the cap screws involved. A feature of the present invention resides in the fact that the entire sealing operation may be accomplished by merely tightening two cap screws. The saving in time which is affected by this construction is believed obvious.

A feature of the present invention resides in the provision of a capsule or gondola which is formed of "Fiberglas" which is of any desired thickness and which is built up in thickness about the peripheral edges and about the peripheral flanges. The thickness of the material may be readily built up by adding additional layers of "Fiberglas" cloth at the desired points so that the flanges and the adjoining areas of the shell are extremely strong. The remainder of the shell need be only of sufficient thickness to withstand the effects of varying pressures and to support any outlets, gauges or the like. The thickness of the shell may also be built up at the point of connection between the gondola and the balloon and parachute structures as well as in the areas which will first strike the ground as the gondola descends.

A further feature of the present invention resides in the manner in which the seal is effected. The flanges are tapered in form, the outer peripheries of these flanges being thinner than the parts of the flanges adjoining the remainder of the shell. A smooth and continuous surface may be provided after the shell has been virtually completed by binding or machining the flanges to the proper shape. The two flanges are held together by arcuate clamping members which are channel-shaped in cross section. The inner surfaces of the channel sides taper similarly to the taper of the flanges. The clamping members are usually semi-circular in form, two such members being employed to entirely encircle the flanges of the shell. By drawing the two clamping members toward one another while the flanges thereof are in contact with the flanges of the shell, the two parts of the gondola may be drawn snugly together, compressing the gasket between the parts of the shell.

An added feature of the present invention resides in the fact that the clamping members may, if desired, be reduced in weight by drilling apertures in the clamping members so as to remove parts of the metal of which these clamping members are formed.

These and other objects and novel features of the present invention will be more clearly and fully set forth in the following specification and claims.

In the drawings forming a part of the specification:

The gondola is indicated in general by the letter A. In the particular arrangement illustrated, the capsule or gondola A is spherical in form. However, it should be understood that while this shape has certain advantages, one or both sections of the shell may be barrel shaped or otherwise elongated if such a shape is desired.

Figure 1:
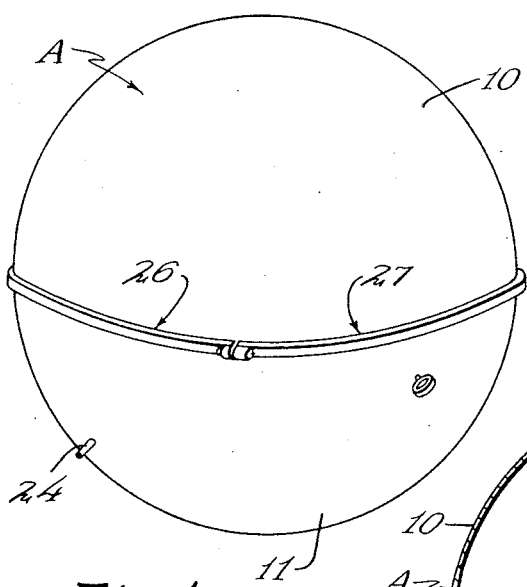
Figure 1 is a perspective view of a capsule or gondola showing the general arrangement of parts thereof.
Figure 5:
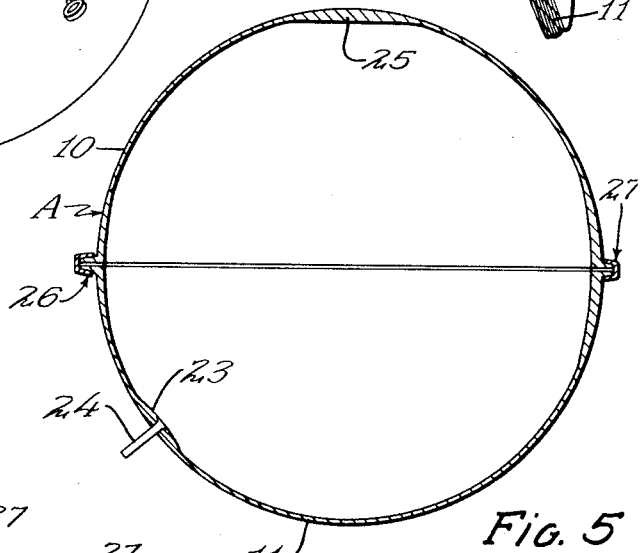
Figure 5 is a cross sectional view through the gondola illustrating the manner in which portions of the wall of the gondola may be thickened in order to accommodate fittings or attachments of any desired type.
Figure 2:
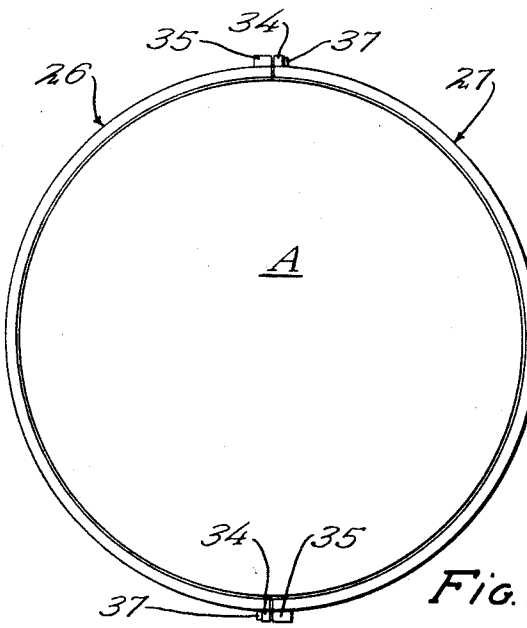
Figure 2 is a top plan view of the capsule or gondola illustrated in Figure 1.

As is indicated in Figures 1 and 5 of the drawings, the gondola A includes a top portion 10 and a bottom portion 11 which are generally similar in form but which may differ slightly in order to accommodate fittings or fastenings of different types. While the shell portions 10 and 11 may be formed in any desired manner, in the particular arrangement illustrated, the portions are formed by laminating layers of glass cloth over a generally semi-spherical form, the glass cloth being impregnated with polyester resin. Products of this type are described in Patent No. 2,513,268 and numerous other patents, the material being well known in the art.

Figure 3:
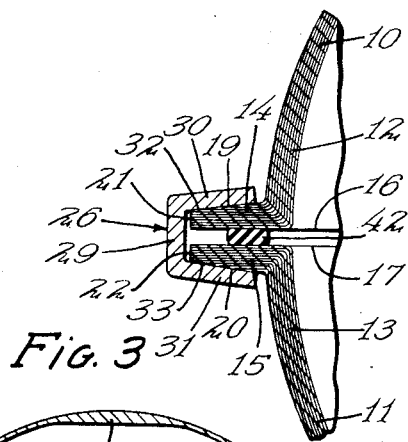
Figure 3 is a cross sectional view through the marginal flanged edges of the portions of the shell and through the clamping member used to clamp these portions of the shell together.

As is indicated in Figure 3 of the drawings, the shell portions 10 and 11 are increased in thickness gradually toward their peripheral edges as indicated at 12 and 13, respectively, and the plastic material is also extended outwardly to provide flanges 14 and 15, respectively. These flanges 14 and 15, as well as the adjoining shell portions 12 and 13, are preferably considerably thicker than the remainder of the shells in the interest of weight conservation.

After the shells have been formed, they are trimmed and ground or machined in any suitable manner to provide flat flange surfaces 16 and 17 and tapered outer surfaces 19 and 20. The outer extremities 21 and 22 of the flanges 14 and 15 are thinner than the portions of these flanges adjoining the shell parts 12 and 13.

As may be seen in Figure 5 of the drawings, local areas of the walls may be thickened by the addition of added layers of resin impregnated glass cloth such as is indicated at 23. A pressure or electrical fitting such as 24 may be threaded or otherwise attached to the shell at this point. The thickness of the shell may also be increased as indicated at 25 if the shell is to be connected to the balloon and parachute at this point, no such means of attachment being illustrated in the drawings as this may be varied. Other local areas of the shell walls may be thickened where required to resist shock. However, in general, the walls of the shells need only be of sufficient thickness to withstand variations in pressure to which the gondola is subjected.

Figure 4:
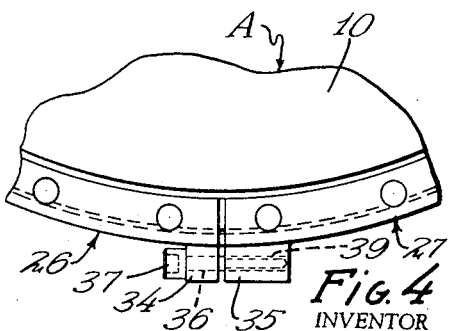
Figure 4 is an enlarged plan view of the adjoining ends of two clamping members, showing the manner in which these clamping members are tightened.

As is indicated in Figures 3 and 4 of the drawings, the shells 12 and 13 are connected together by clamping members 26 and 27, both of which may be identical in form. Each clamping member is generally channel-shaped in cross section including a base flange 29 and upper and lower flanges 30 and 31. The flanges 30 and 31 are provided with inner surfaces 32 and 33, respectively, which are inclined to fit the taper of the shell flanges 14 and 15. If the clamping members 26 and 27 are of uniform wall thickness, the flanges 30 and 31 diverge apart toward the center of arcuation. However, if desired, the flanges 30 and 31 may also taper to fit the shape of the flanges 14 and 15.

One end of each clamping member is provided with a relatively narrow lug 34 at one extremity and a relatively wider lug 35 at its opposite extremity. Each lug 34 is provided with an aperture 36 therethrough to freely accommodate a cap screw 37. The longer lug 35 is provided with an internally threaded aperture 39 extending therethrough, the apertures 36 and 39 being in alignment when the two clamping members are in shell encircling position. The cap screws or bolts 37 serve the purpose of drawing the ends of the clamping members together. Two semi-circular clamping members function very effectively in actual operation, and additional clamping members of shorter angular length would only be used if gerater strength is required.

As is indicated in Figure 4 of the drawings, the weight of the clamping members 26 and 27 may be materially reduced by drilling or forming apertures in the various flanges thereof. In the particular arrangement illustrated, aligned apertures such as 40 are provided in the flanges 30 and 31 of the clamping members while offset apertures such as 41 are provided in the base or connecting flange 29. The particular arrangement or shape of these apertures may obviously be varied if desired.

The operation of the apparatus is believed obvious from the foregoing description. Shortly before the time the capsule or gondola A is to make its ascent, the instruments within the gondola are set or calibrated. The manner in which these instruments are supported within the gondola is not illustrated as this is a matter of choice. The two parts of the gondola are then placed in mating relation, and the clamping members 26 and 27 are positioned to encircle the flanges 14 and 15. Cap screws such as 37 are inserted through the lugs 34 and threaded into the cooperable lugs 35 on opposite sides of the gondola.

A gasket 42 is interposed between the flanges 14 and 15 to form a seal between these parts.

As the cap screws 37 are tightened, the clamping members 26 and 27 are drawn into more intimate relation with the flanges 14 and 15, and the tapering inner surfaces of the clamping members act upon the similarly tapered surfaces of the flanges to draw these flanges more closely together. These screws are tightened until an effective seal is produced.

It will be seen that through this arrangement a tight closure is provided which is highly resistant to shock and yet which is light in weight and easily secured together. In actual tests, it has been shown that capsules or gondolas of the type described may be assembled in a small fraction of the time required for the sealing of gondolas of the more conventional types. At the same time, the gondolas are stronger and more resistant to shock than are previous forms of construction.

In accordance with the patent statutes, I have described the principles of construction and operation of my capsule or gondola, and while I have endeavored to set forth the best embodiment thereof, I desire to have it understood that obvious changes may be made within the scope of the following claims without departing from the spirit of my invention.

I claim:

1. A gondola for use in high altitude research including a pair of mating concave body portions having smooth inner surfaces and having peripheral flanges about their marginal edges, the flanges extending outwardly from the body portion, the body portions being made up of laminations of glass cloth impregnated with a resin with the surfaces of said laminations extending generally in the direction of curvature of said body portions, the walls being gradually built up in thickness toward the marginal edges thereof by a greater number of laminations in these areas and being of greatest thickness at the juncture of the body portions with their flanges, the laminations being continuous in the marginal edge of the body and in the flange with the portions of said laminations constituting said flanges lying in substantially parallel planes, the inner opposed flange surfaces being flat and the outer surfaces being tapered in thickness toward the periphery thereof, a gasket between said flanges, and clamping ring segments engageable over said flanges, said segments being channel shaped in section and including a base and diverging sides having their inner surfaces continuously tapering from said base at the angle of taper of said flanges.

2. The structure of claim 1 and including thickened areas in said body portions providing reinforced areas for instrument and support connections, said thickened areas being formed of added laminations of glass cloth of graduated size on the inner surface of the body portions.

3. The structure of claim 2 and in which said body portions have a hemispherical outer surface.

References Cited in the file of this patent

UNITED STATES PATENTS

| | | |
|---|---|---|
| 261,086 | Dummer et al. | July 11, 1882 |
| 549,220 | Townsend et al. | Nov. 5, 1895 |
| 1,059,159 | Hlavitzer | Apr. 15, 1913 |
| 1,966,241 | Furrer | July 10, 1934 |
| 2,280,501 | Stephenson | Apr. 21, 1942 |
| 2,410,323 | Wellman | Oct. 29, 1946 |
| 2,525,469 | Anderson | Oct. 10, 1950 |
| 2,659,222 | Meier | Nov. 17, 1953 |
| 2,737,309 | Miller | Mar. 6, 1956 |
| 2,749,266 | Edred | June 5, 1956 |

FOREIGN PATENTS

| | | |
|---|---|---|
| 689,628 | Great Britain | Apr. 1, 1953 |